United States Patent
Saha

(10) Patent No.: US 12,373,251 B2
(45) Date of Patent: Jul. 29, 2025

(54) TECHNIQUES FOR HANDLING POLLING FREQUENCY IN EVENT DELIVERY NETWORK (EDN)

(71) Applicant: Oracle International Corporation, Redwood Shores, CA (US)

(72) Inventor: Tapan Kanti Saha, Bangalore (IN)

(73) Assignee: Oracle International Corporation, Redwood Shores, CA (US)

(\*) Notice: Subject to any disclaimer, the term of this patent is extended or adjusted under 35 U.S.C. 154(b) by 477 days.

(21) Appl. No.: 18/086,514

(22) Filed: Dec. 21, 2022

(65) Prior Publication Data

US 2024/0211306 A1    Jun. 27, 2024

(51) Int. Cl.
| | | |
|---|---|---|
| G06F 3/00 | (2006.01) | |
| G06F 9/48 | (2006.01) | |
| G06F 9/54 | (2006.01) | |
| H04L 43/103 | (2022.01) | |
| H04L 69/28 | (2022.01) | |
| H04W 72/0453 | (2023.01) | |

(52) U.S. Cl.
CPC .......... *G06F 9/4881* (2013.01); *G06F 9/542* (2013.01); *H04L 43/103* (2013.01); *H04L 69/28* (2013.01); *H04W 72/0453* (2013.01)

(58) Field of Classification Search
CPC ...................................................... G06F 9/50
See application file for complete search history.

(56) References Cited

U.S. PATENT DOCUMENTS

| | | | | |
|---|---|---|---|---|
| 8,150,429 | B1* | 4/2012 | Zheng | H04W 4/08 379/92.02 |
| 9,632,850 | B1* | 4/2017 | Emam | H04L 47/58 |
| 2003/0042731 | A1* | 3/2003 | Li | G07C 13/00 283/5 |
| 2007/0027987 | A1* | 2/2007 | Tripp | H04L 9/40 709/225 |
| 2007/0294392 | A1* | 12/2007 | Balasubramanian | G06F 9/542 709/224 |
| 2008/0270389 | A1* | 10/2008 | Jones | G06F 16/951 707/999.005 |
| 2011/0289431 | A1* | 11/2011 | Olumoko | G06Q 30/0203 709/204 |

(Continued)

OTHER PUBLICATIONS

H'sien J. Wong, The Design of MPI Based Distributed Shared Memory Systems to Support OpenMP on Clusters. (Year: 2007).*

(Continued)

*Primary Examiner* — Lechi Truong
(74) *Attorney, Agent, or Firm* — Kilpatrick Townsend & Stockton LLP

(57) ABSTRACT

Techniques are described for reducing the polling requests received at the event delivery network (EDN) of the service-oriented architecture system (e.g., a cluster of SOA server instances). An on-demand parallel polling technique may be implemented by doing one or more of categories for events, consumer applications and/or polling threads with different polling time intervals; thread-sharing in a thread pool of a SOA server instance between polling threads and scheduler threads; polling status (e.g., active/inactive) assigned to the SOA server instances, and/or on-demand polling where active SOA server instances may activate inactive SOA server instances on demand.

18 Claims, 10 Drawing Sheets

(56) References Cited

U.S. PATENT DOCUMENTS

| | | | |
|---|---|---|---|
| 2012/0131095 A1* | 5/2012 | Luna | H04L 69/28 |
| | | | 709/224 |
| 2015/0081906 A1* | 3/2015 | Backholm | H04L 67/54 |
| | | | 709/225 |
| 2016/0127292 A1* | 5/2016 | Birger | H04L 51/216 |
| | | | 709/206 |
| 2022/0283874 A1* | 9/2022 | Reyes Lozano | G06F 9/5077 |

OTHER PUBLICATIONS

"Adjusting Polling Bandwidth", Tivoli Network Manager IP Edition 4.2.0, Jun. 10, 2022, 1 page.
"Administering Multiple Pollers", Tivoli Network Manager IP Edition 4.2.0, Jun. 10, 2022, 1 page.
"Multiple Poller Overview", Tivoli Network Manager IP Edition 4.2.0, Jun. 10, 2022, 2 pages.
"Optimize Polling Engines in Your SolarWinds Platform Deployment", Available Online at: https://documentation.solarwinds.com/en/success_center/orionplatform/content/core-optimization-polling-engines.htm, Accessed from internet on Jun. 30, 2022, 5 pages.
"Polling the Network", Tivoli Network Manager IP Edition 4.2.0, Jun. 10, 2022, 1 page.
"Setting Up an Additional Poller", Tivoli Network Manager IP Edition 4.2.0, Jun. 10, 2022, 3 pages.
Appel et al., "Eventlets: Components for the Integration of Event Streams with SOA", Conference: 5th IEEE International Conference on Service-Oriented Computing and Applications (SOCA), Dec. 2012, 9 pages.

* cited by examiner

TECHNIQUES FOR HANDLING POLLING FREQUENCY IN EVENT DELIVERY NETWORK (EDN)

BACKGROUND

In today's distributed computing environment there is a constant need to enable faster data communications. This is especially true for a cloud service provider (CSP) providing cloud services to subscribing customers. Faster data communications translate to faster delivery of the cloud services to users of the cloud services, which in turn translates to better customer and user experience. There is thus a constant desire to improve the infrastructure provided by the CSP for provisioning cloud services.

In a Service-Oriented Architecture (SOA), events are published to an Event Delivery Network (EDN) and consist of message data sent as the result of an occurrence in an environment (e.g., a business environment). When an event is published, other service components can subscribe to the event. For example, the service components subscribed to an event may poll the EDN. With the current SOA implementations, the EDN gets a large number of simultaneous calls to poll an event at a given time. The calls are received even when there is no event in the EDN to poll. On the cloud, where there are large number of events and a large of consumer applications (e.g., the service components subscribed to an event, applications), the calls to EDN generated by all these service components (e.g., consumer applications) result in an unstable system. There is always a need for improvements in the architectures of network devices and the techniques they use for providing faster data communications.

BRIEF SUMMARY

The present disclosure relates to managing a service-oriented architecture system, and more particularly to improved techniques for controlling the polling frequency of (e.g., controlling the polling requests received at) the event delivery network (EDN) of the service-oriented architecture system (e.g., a cluster of SOA server instances). Various embodiments are described herein, including methods, systems, non-transitory computer-readable storage media storing programs, code, or instructions executable by one or more processors, and the like.

According to certain embodiments, techniques (e.g., a method, a system, or code or instructions executable by one or more processors) are provided for reducing the frequency of polling requests received at the EDN of a cluster of SOA server instances. A plurality of events are received at an event delivery network (EDN) of the service-oriented architecture system (e.g., a cluster of SOA server instances). Each SOA server instance may include a plurality of applications, as well as a plurality of consumer applications that are subscribed to events of one or more of the plurality of applications posted to the EDN. The EDN may receive a plurality of requests from the plurality of consumer applications for polling one or more of the plurality of events that are posted to the EDN. The method may include identifying one or more successfully polled events. The method may then identify a first set of events, among the successfully polled events, that appear at a first frequency. A first category (e.g., frequent category) is assigned to the first set of events (e.g., frequent events). The consumer applications subscribed to the first set of events are then categorized in the first category (e.g., frequent consumer applications) associated with a first polling time interval (e.g., frequent polling interval). A first portion of the plurality of requests from the plurality of consumer applications are then processed at the first polling time interval. Accordingly, polling frequency of the event delivery network is reduced. The first portion of the plurality of requests are from the consumer applications in the first category.

In some embodiments, the method may also include identifying a second set of events, among the successfully polled events, that appear at a second frequency. For example, the second frequency is lower than the first frequency. A second category (e.g., non-frequent category) is assigned to the second set of events (e.g., non-frequent events). The consumer applications subscribed to the second set of events are categorized in the second category (e.g., non-frequent consumer applications) associated with a second polling time interval (e.g., non-frequent polling interval) different than the first polling time interval (e.g., frequent polling interval). A second portion of the plurality of requests from the plurality of consumer applications are then processed at the second polling time interval. The second portion of the plurality of requests are from the consumer applications in the second category (e.g., non-frequent consumer applications).

The foregoing, together with other features and embodiments will become more apparent upon referring to the following specification, claims, and accompanying drawings.

DETAILED DESCRIPTION

Figure 1:
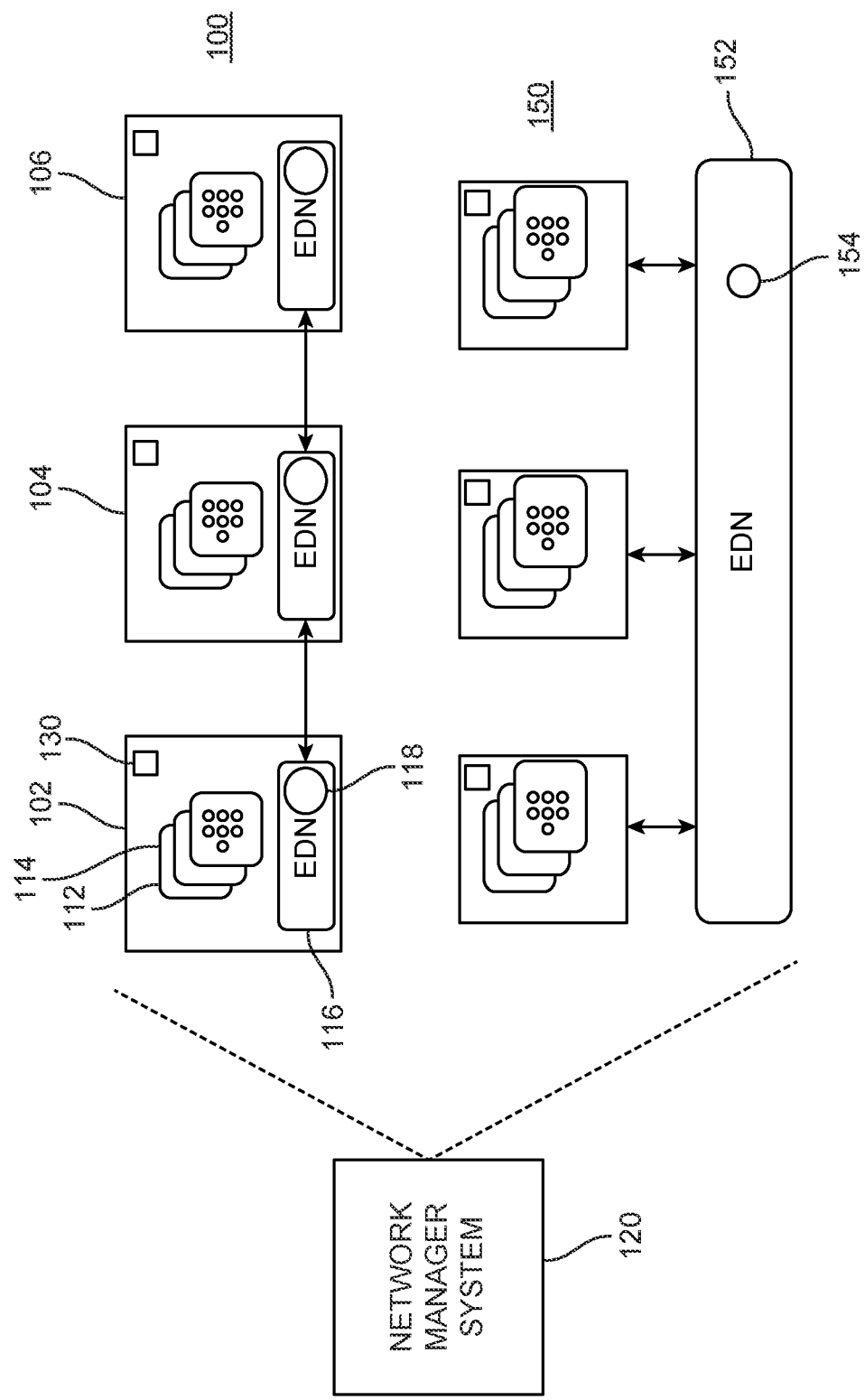
FIG. 1 is a block diagram illustrating a system including a plurality of Service-Oriented Architecture (SOA) instances, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration."

The present disclosure relates to managing a service-oriented architecture system, and more particularly to improved techniques for controlling the polling frequency of (e.g., controlling the polling requests received at) the event delivery network (EDN) of the service-oriented architecture system (e.g., a cluster of SOA server instances). Various embodiments are described herein, including methods, systems, non-transitory computer-readable storage media storing programs, code, or instructions executable by one or more processors, and the like.

A Service-Oriented Architecture (SOA) is an architectural style for building software applications that use services available in a network such as the web. It promotes loose coupling between software components so that they can be reused. Applications in SOA are built based on services. A service is an implementation of a well-defined business functionality, and such services can then be consumed by clients in different applications or business processes. SOA facilitates the development of enterprise applications as modular business web services that can be easily integrated and reused, creating a truly flexible and adaptable IT infrastructure.

A SOA server instance may include a plurality of composite applications. A composite application may include an assembly of services, service components, references, and wires designed and deployed together to meet a business need. One or more events that occur in a SOA server instance may be published to an Event Delivery Network (EDN). The events may include message data sent as the result of an occurrence in connection with the application. When an event is published, other applications (e.g., event consumer applications, consumer applications) may subscribe to the event to get notified when the event is published to the EDN.

In a big cluster of SOA server instances, provisioning a large number of event consumer applications generates a large resource pressure on the EDN when events are continuously polled. A message-driven event poller communication approach may be used to address this issue. Embodiments provide a system that can cater to a large number of event consumer applications for a large number of events being polled by pollers (e.g., consumer applications). A poller may use a polling thread to poll the EDN for a specific event associated with an application on behalf of one or more event consumer applications that are subscribed to the event posted to the EDN. Embodiments provide an on-demand parallel polling technique that may include one or more of consumer categories, event categories, shared thread pools and active/inactive pollers (e.g., consumer applications on SOA server instances polling the EDN using one or more polling threads). The EDN architecture described herein may be well suited for use in cloud systems.

Embodiments provide a system that is configured to dynamically adjust the number and a polling state of pollers (e.g., consumer applications) of events on the EDN. The system is configured to categorize then group the events and/or the pollers and the polling behavior of the pollers. In some embodiments, the poller behavior may be determined based on categorization and/or injection of context (e.g., user input). Embodiments reduce the concurrency in polling the EDN. This can be accomplished by providing a network manager that implements an on-demand parallel polling technique by doing one or more of: (1) using categories for events, consumer applications and/or polling threads with different polling time intervals; (2) sharing threads in a thread pool of a SOA server instance between polling threads and scheduler threads; (3) assigning polling status (e.g., active/inactive) to the SOA server instances, and/or (4) implementing on-demand polling where active SOA server instances may activate inactive SOA server instances on demand.

FIG. 1 illustrates an exemplary system including a plurality of Service-Oriented Architecture (SOA) server instances, according to at least one embodiment. As shown in FIG. 1, a network manager system 120 may monitor a SOA environment 100 with multiple SOA server instances 102, 104, 106. According to various embodiments, each SOA server instance 102, 104, 106 may be a process (e.g., a port in a cloud environment), and together the SOA server instances 102, 104, 106 may form a cluster. One of ordinary skill in the art will appreciate that the cluster is not limited to the number of SOA server instances shown in FIG. 1, and that the cluster may include any number of SOA server instances that may be supported by the network manager system 120. Each EDN module 116 in a given SOA server instance 102, 104, 106 may be physically separate but logically interconnected.

Each SOA server instance 102, 104, 106 may include a plurality of composite applications 112. For example, an exemplary SOA server instance may have 650+ composite applications. Each application 112 may have a plurality of consumer applications 114. That is, consumer applications 114 of an application 112 may be subscribed to one or more events posted by the application 112 to the event delivery network (EDN) module 116. The consumer applications 114 of the application 112 may be other composite applications on the same SOA server instance 102, or on other SOA server instances 104, 106.

According to various embodiments, each SOA server instance 102, 104, 106 may be identical to each other. Each SOA server instance 102, 104, 106 may be running on one or more host servers (e.g., computer systems). Similarly, the network manager system 120 may be running on one or more computer systems. The host server(s) of the SOA server instances 102, 104, 106 and the host server(s) of the network manager system 120 may overlap or may be mutually exclusive. In some embodiments, each SOA server instance 102, 104, 106 may include a manager instance 130 that is configured to communicate with the network managers system 120. For example, the manager instance 130 of SOA server instance 102 may be configured to provide the status of the SOA server instance 102, and/or the applications 112 of the SOA server instance 102 to the network manager system 120. The manager instance 130 may also receive instructions from the network manager system 120 to set the status of the consumer applications of SOA server instance 102 to active/inactive, or to assign a category (e.g., fast/slow) to the events and/or consumer of the events of the SOA server instance 102.

Categorizing Events, Consumer Applications and or Pollers

In some embodiments, each SOA server instance 102, 104, 106 may include a local data storage module 118 (e.g., local cache) incorporated in the EDN module 116 of that SOA server instance. The local data storage module 118 may be configured to store identifying information for consumer applications (e.g., IDs for consumer applications that poll the EDN) that most recently successfully polled an event on the EDN module 116. The consumer applications identified in the local data storage module 118 (e.g., the consumer applications that most recently successfully polled an event on the EDN) may be scheduled for next polling as fast-pollers and remaining consumer applications of the SOA server instance may be scheduled as slow-pollers. In some embodiments, the local data storage module 118 could have specified eviction policy and size based on the system requirement and resource capacity.

In some embodiments, the local data storage module 118 of the SOA server instances 102, 104, 106 may be implemented as a common distributed data storage module, that stores the same information as described above.

FIG. 1 further illustrates a system 150 as a logical representation of the SOA environment 100. In system 150, the EDN 152 is provided as a logical layer that can be polled by the SOA server instances 102, 104, 106. The EDN 152 includes the local data storage module 154, as described above.

In an exemplary user case scenario, an application may have C number of event consumer applications (e.g., application_1 has 600+ event consumer applications at the moment and growing), each SOA server instance may have T (T<<C) number of threads in a thread pool. A polling thread polls one event on behalf of C number of consumer applications in each S seconds interval. In this exemplary scenario, the number of polling calls increases sharply when the number of SOA server instances in the cluster increases. In conventional systems using flat polling, when N is large, N*T results in large concurrent polling which impacts resource use, system health and performance. This illustrated in graph 300 of FIG. 3 where the x-axis 302 represents the number of available polling threads, the y-axis 304 represents the number of SOA server instances, and the resulting plot 306 illustrates the sharp increase in the resulting concurrent polling calls on the EDN module. Embodiments flatten the plot, and therefore decrease the resulting concurrent polling calls on the EDN module. This is illustrated in graph 320, which is described below in greater detail.

Figure 2:
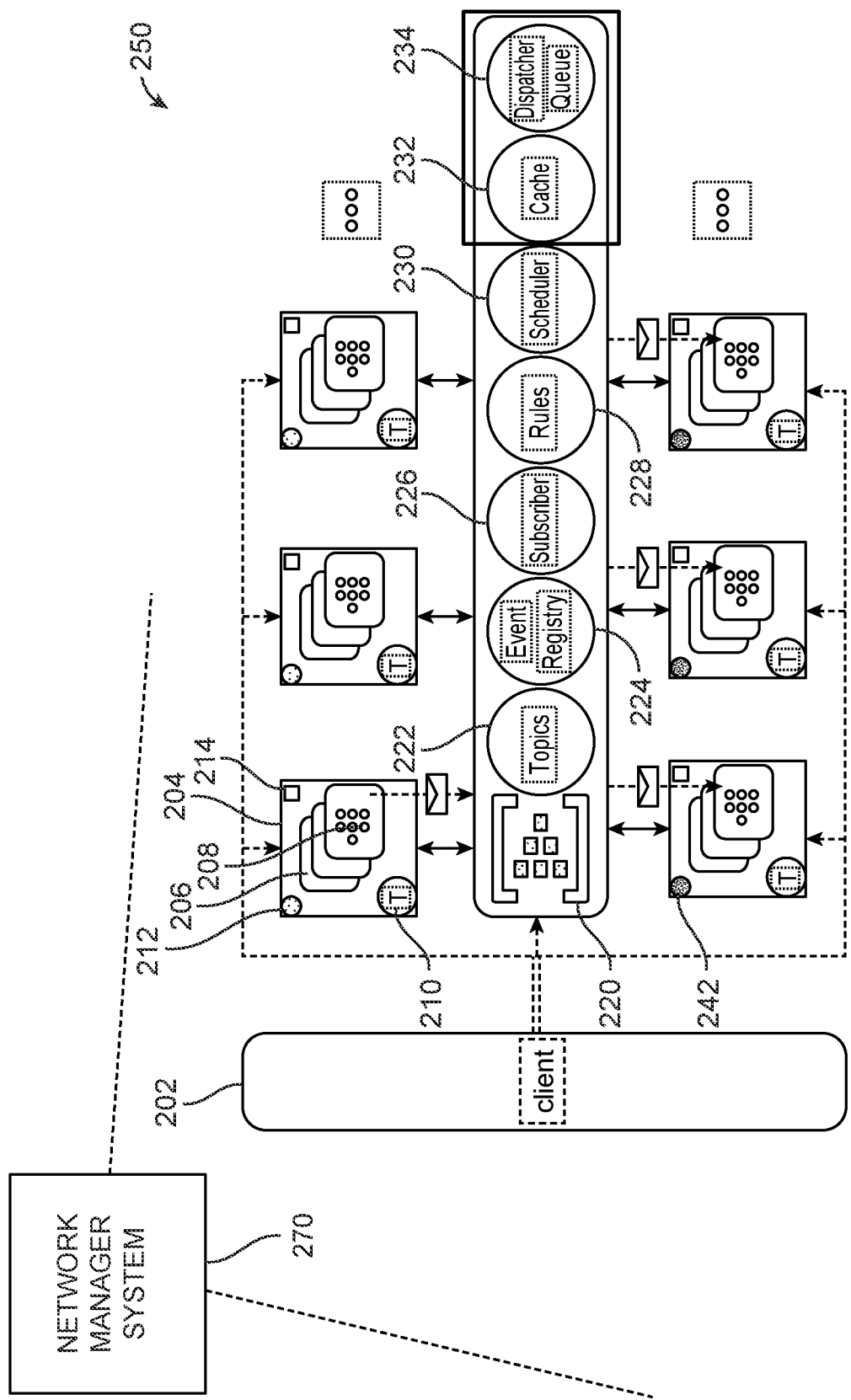
FIG. 2 is a block diagram illustrating a polling technique for an Event Delivery Network (EDN) of the system including the plurality of Service-Oriented Architecture (SOA) instances, according to at least one embodiment.

FIG. 2 illustrates a polling technique for an Event Delivery Network (EDN) module of the system 200 including the plurality of Service-Oriented Architecture (SOA) server instances, according to at least one embodiment. As shown in FIG. 2, an exemplary SOA server instance 204 may include a plurality of composite applications 206, and each application may include multiple consumer applications 208 subscribed to the events posted on the EDN module 220. In some embodiments, a client 202 outside to the cluster of SOA server instances may also post events to the EDN module 220. Each SOA server instance 204 further includes a thread pool 210 for polling events on the EDN module 220.

Referring now to the EDN module 220, the topics module 222 is a storage module for all incoming events. All incoming events are registered at an event registry 224. A subscribe module may store a mapping between the events and identifying information for the composite applications that are subscribed to the events. A rules module 228 may store one or more rules that will be applied to the events to, for example, filter the events. A scheduler module 230 is configured to schedule consumer applications of an SOA server instance to poll the events on the EDN module 220. According to various embodiments, the EDN module 220 further includes a local data storage module 232 (e.g., local cache) and a dispatcher queue 234, which were not included in conventional systems.

According to various embodiment, the network managing system 270 categorizes consumer applications into a predetermined number of categories (e.g., frequent/fast consumer applications, non-frequent/slow consumer applications). Consumer applications in a first category or a first set of categories (e.g., the frequent consumer applications) may be scheduled at more frequent time intervals than the consumer applications in the remaining categories (e.g., the non-frequent consumer applications). Therefore, the polling load on the EDN module 220 is reduced. In essence, the categorization is used to minimize polling per SOA server instance. One of ordinary skill in the art will appreciate that there may be additional levels or numbers of categorization, and that categorizing into 2 groups (frequent/non-frequent) is for illustrative purposes only.

In an exemplary embodiment, the non-frequent consumer applications may be allowed to poll after every ~2S interval than frequent consumer applications (S). The frequent consumer applications may be assigned to a fast poller or scheduler for fast polling, and the non-frequent consumer applications may be assigned to a slow poller or scheduler for slow polling. According to various embodiments, there may be as many pollers or schedulers as the number of poller groups.

Changing the frequency associated with pollers for when poll calls are made reduces the concurring polling of the EDN module 220. For example, in a conventional system with a cluster of "N" SOA server instances with each SOA server instance executing "M" pollers and each poller configured to poll every second, (60*N*M) poll calls were made to the EDN module every minute. By categorizing pollers (e.g., consumer applications) into two or more categories and assign different polling frequencies to the categories, embodiments reduce the number of poll calls made to the EDN module. For example, a consumer application in the first category (e.g., a "fast" consumer application) may still poll the EDN every second, but the polling frequency of a poller in the second category (e.g., a "slow" consumer application) may be changed to every 5 or 10 seconds. In this manner, the number of poll calls made on the EDN per minute is now less than (60*N*M) poll calls.

The network managing system 270 may categorize the consumer applications and/or events into categories based on the information stored in the local data storage module 232 (e.g., local cache) of the EDN module 220. The local storage module 232 may store a list of events that were polled recently (e.g., polled within a predetermined amount of time). The network managing system 270 (in collaboration with the local manager instances 214 of the SOA server instances 204) may then identify, on the list of events, one or more events that were successfully polled.

The network managing system 270 may then identify a first set of events, among the successfully polled events, that appear at a first frequency, and assign a first category to the first set of events. For example, the events that appear at the local storage module 232 at a higher frequency may be assigned the frequent event category. The network managing system 270 may then categorize consumer applications subscribed to the first set of events in the first category associated with a first polling time interval. For example, the consumer applications that are subscribed to the frequent events may be categorized as frequent or fast consumer applications with a polling time interval that is shorter than other polling time intervals (e.g., the fast consumer applications will poll the EDN more frequently). This way, the network managing system 270 may process a first portion of the plurality of requests from the plurality of consumer applications (e.g., requests from the frequent/fast consumer applications) at the first polling time interval thereby reducing a polling frequency of the event delivery network.

Similarly, the network managing system 270 may identify a second set of events, among the successfully polled events, that appear at a second frequency, and assign a second category to the second set of events. For example, the events that appear at the local storage module 232 at a lower frequency may be assigned the non-frequent event category. The network managing system 270 may then categorize consumer applications subscribed to the second set of events in the second category associated with a second polling time interval that is different than the first polling time interval. For example, the consumer applications that are subscribed to the non-frequent events may be categorized as non-frequent or slow consumer applications associated with a polling time interval that is longer than other polling time intervals (e.g., the slow consumer applications will poll the EDN less frequently). This way, the network managing system 270 may process a second portion of the plurality of requests from the plurality of consumer applications (e.g., requests from the non-frequent/slow consumer applications) at the second polling time interval thereby reducing a polling frequency of the event delivery network.

According to various embodiments, the plurality of events may be categorized into at least two categories of events based on a dynamic scheme. For example, a first event may be categorized in the first category (e.g., frequent) and polled at the first polling time interval (e.g., fast) during a first polling request. The same first event may then be categorized in a second category (e.g., non-frequent) and polled at a second polling time interval (e.g., slow) during a second polling request. In some embodiments, the categorization may change depending on the load on the EDN module 220, the requirements of the overall system and/or the restrictions on the overall system. The number of categories and events assigned to each category may change based on the number of the polling requests that are received at the EDN module 220.

Assigning Status to SOA Server Instances

In a cluster of SOA server instances (such as the cluster 250 illustrated in FIG. 2), a predetermined number of SOA server instances may be assigned an active poller status, while in the rest of SOA server instances may be assigned an inactive poller status. An inactive SOA server instance may generally refer to a SOA server instance with an inactive polling state, and not currently polling the EDN module 220 for events. Consumer applications on an active SOA server instance may poll the EDN module 220 while the consumer applications on an inactive SOA server instance do not poll the EDN module 220. The categorization of the SOA server instances into one or more categories reduces the number of poll calls made on the EDN module 220 per unit of time (e.g., per minute). If additional polling capacity is needed, the inactive SOA server instances may be activated on-demand based on the load of the system (e.g., amount of polling calls received at the EDN module 220).

For example, the status of a given SOA server instance 204 is shown with an indicator 212 (e.g., active) and 232 (e.g., inactive) in FIG. 2. At a given time, only the consumer applications of the active SOA server instances may be allowed to poll events on the EDN module 220. This protocol reduces overall frequency of polling of the EDN module.

For example, for a cluster of N unit of SOA server instances, the system may be configured to have, at a given moment, M unit of SOA server instances (M<<N) which perform regular polling (e.g., are assigned "active" status). In an exemplary embodiment, 30% of the SOA server instances (e.g., M instances) are assigned an "active" status. The consumer applications of all active SOA server instances may poll the EDN module 220 concurrently, even when there is no event on the EDN module 220.

In some embodiments, the consumer applications of the active SOA server instances may poll events and if a predetermined condition is met (e.g., the system is under load, the active SOA server instances are not enough to poll all events in the EDN module 220), then the active SOA server instances may broadcast a message to the (N-M) SOA server instances that have an "inactive" status to start the polling activity. One or more of the inactive SOA server instances assume a temporary active status, and consumer applications of the now-activated inactive SOA server instances poll the EDN module 220 for a cycle (e.g. a number of times polled by a thread in a schedule called "batch size" or a cycle), and revert back to inactive status again once the inactive SOA server instances complete a cycle and/or after no successful polling (e.g., the system is no longer under load, there were no events to poll on the EDN module). The batch size may also be adjusted dynamically based on the load on the system or the resources available to the system. According to various embodiments, the threshold for determining whether the system is under load may be configured. For example, the threshold may be set by default to "X number of successive polls in a cycle" to get a sense of the event load. The threshold may be updated when the initial threshold is reached.

According to various embodiments, the network manager system 270 may determine that a number of requests for polling the events posted to the EDN module 220 is below a predetermined threshold. The network manager system 270 may assign an active status 212 to a first set of SOA server instances. The consumer applications of the first set of SOA server instances are allowed to poll the EDN module 220 at assigned polling time intervals. The network manager system 270 may assign an inactive status 242 to a second set of SOA server instances. The consumer applications of the second set of SOA server instances are prevented from polling (e.g., are not allowed to poll) the EDN module 220.

In some embodiments, the network manager system 270 may determine that the number of the plurality of requests for polling one or more of the plurality of events posted to the event delivery network matches or surpasses the predetermined threshold. In such embodiments, the consumer applications of the first set of SOA server instances broadcast a message to activate one or more of the consumer applications of the second set of SOA server instances. Upon activation, the activated consumer applications of the second set of SOA server instances poll the EDN module at assigned polling time intervals. Upon completing one round of polling, the activated consumer applications of the second set of SOA server instances re-assume their inactive status.

The active/inactive status assigned to SOA server instances reduce the number of polling requests (e.g., polling calls) received at the EDN module, thereby reducing the computation load on the overall network architecture.

Thread-Sharing within a Thread Pool

Embodiments implement sharing among thread-pools. Each SOA server instance 204 may include a thread pool 210 that stores a plurality of scheduling thread and polling threads. A scheduling thread schedule N number of consumer applications to poll by T polling threads. At a given point in time, a first set of threads are used for scheduling the consumer applications for polling the EDN module 220 and a second set of threads are used for polling the events on the EDN module 220. The allocation of threads among scheduling/polling processes may be adjusted dynamically based on an active (e.g., current) load on the system. Sharing the same thread-pool in both processes (e.g., scheduling and polling) avoids overscheduling and improve the stability of the system.

According to various embodiments, a given SOA server instance 204 may include a first set of threads for polling the EDN module 220 and a second set of threads for scheduling the first set of threads. When processing a first polling request, the network manager system 270 may assign a first thread to the consumer applications in the first category. The network manager system 270 may then schedule, using a second thread, the first thread to poll the EDN module 220 at the first polling time interval. The first thread is used as a polling thread and the second thread is used as a scheduling thread during processing of the first polling request. When processing a second polling request upon completion of the first polling request, the network manager system 270 may assign the second thread to the consumer applications in the first category. The network manager system 270 may then schedule, using a third thread, the second thread to poll the EDN module 220 at the first polling time interval. The second thread is used as a polling thread during processing of the second polling request. According to various embodiments, allocation of a thread as a polling thread or a scheduling thread may be based on a number of the plurality of requests for polling the events posted to the EDN.

Figure 3:
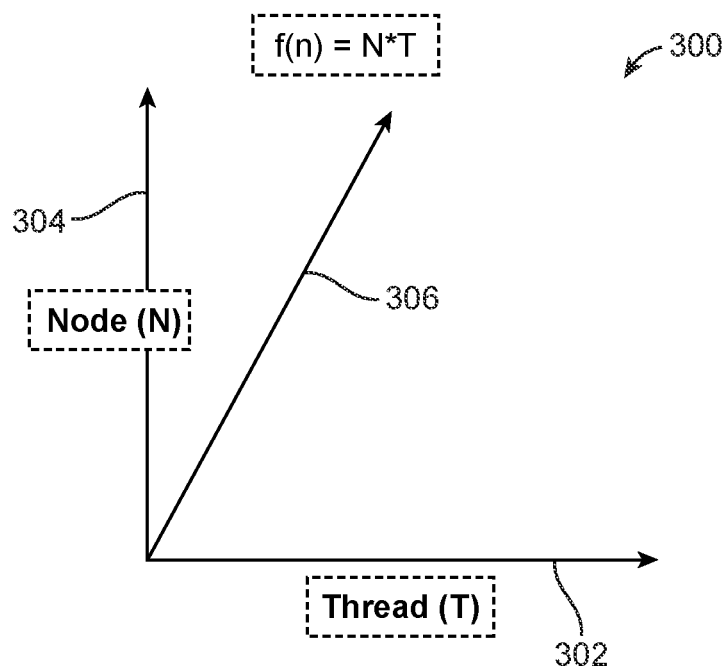
FIG. 3 illustrates two graphs showing the correlation between a number of available polling threads and a number of SOA server instances in determining an amount of concurrent polling calls on the EDN module, according to at least one embodiment.
Figure 3:
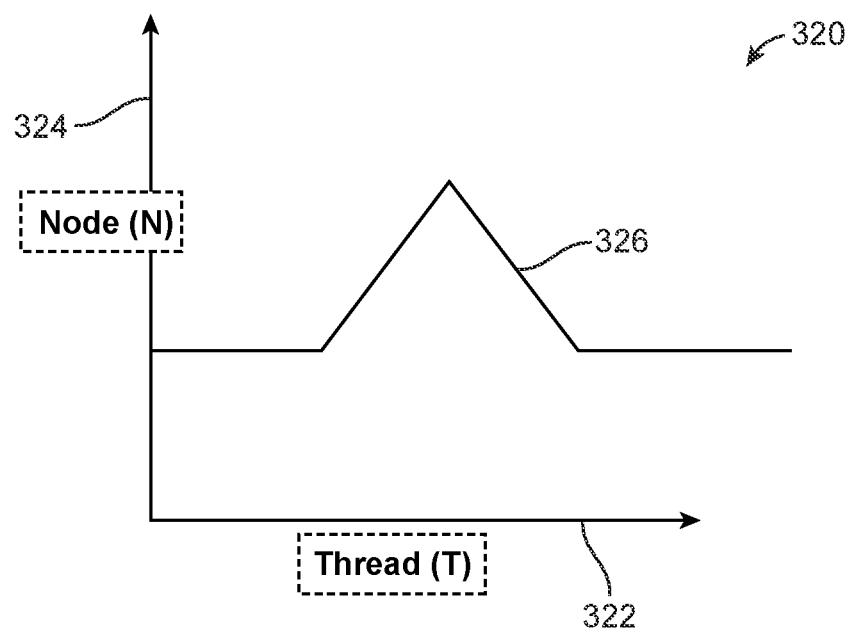

As shown in graph 320 of FIG. 3, the x-axis 302 represents the number of available polling threads, the y-axis 304 represents the number of SOA server instances, and the resulting plot 326 illustrates the overall steady load on the system where an increase in the polling requests are handled by increasing the active SOA server instances (e.g., the active SOA server instances activated the inactive SOA server instances to handle the increased polling requests). When the polling requests are back to their previous state, the amount of the active SOA server instances returns back to the previous state as well (e.g., the SOA server instances that were activated on-demand assume their inactive status upon processing the polling requests).

Figure 4:
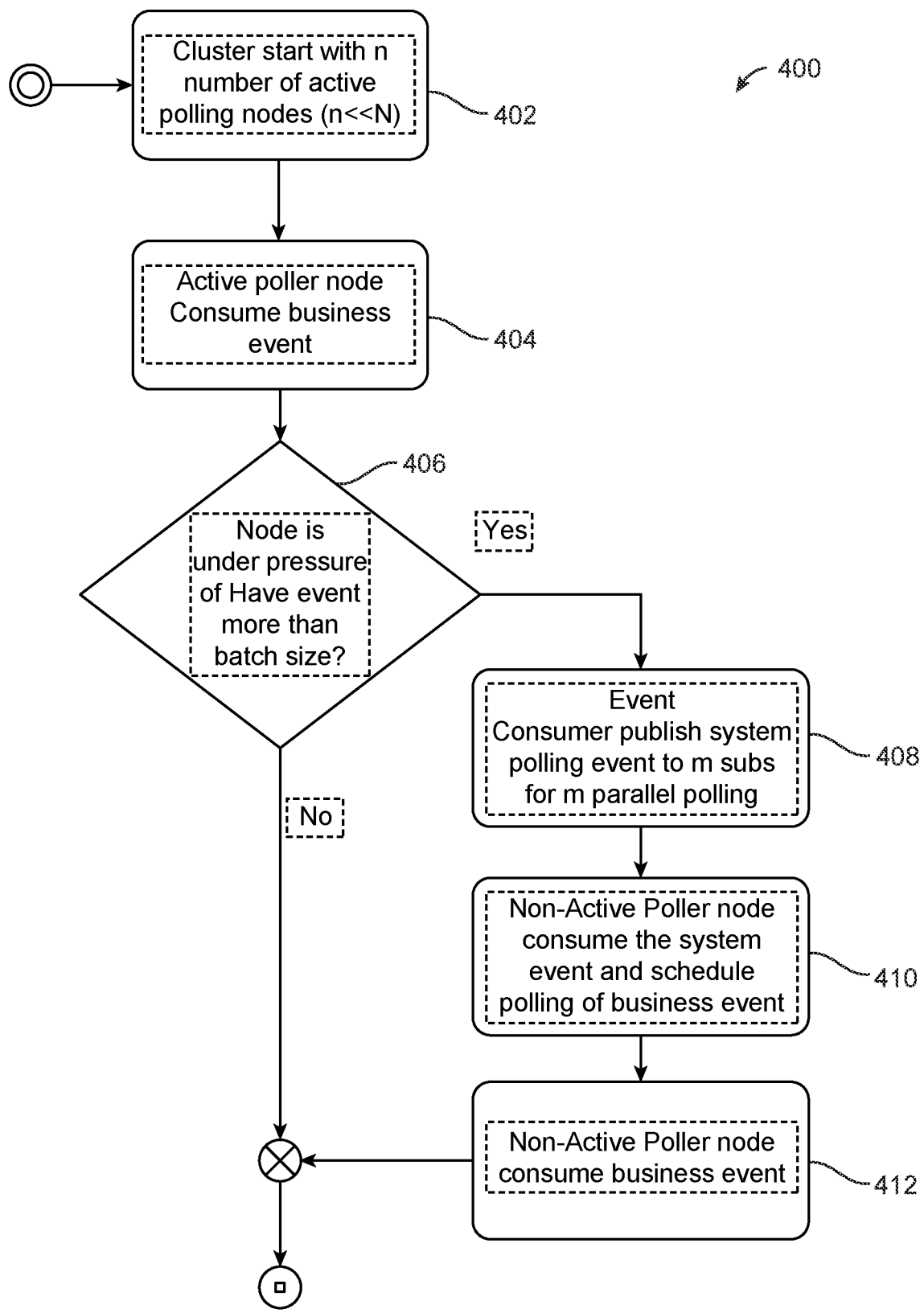
FIG. 4 illustrates an exemplary flowchart of steps for implementing one or more of the techniques described herein to reduce the amount of polling request per unit time on the EDN, according to at least one embodiment.

FIG. 4 illustrates an exemplary flowchart 400 of steps for implementing one or more of the techniques described herein to reduce the amount of polling request per unit time on the EDN, according to various embodiments.

At step 402, there are n number of active SOA server instances in a given cluster including N number of SOA server instances, where n is a number much smaller than N. For example, the network manager system 270 may have assigned an active status to n number of SOA server instances among the N number of SOA server instances.

At step 404, the consumer applications on the n active SOA server instances poll the EDN module for events. For example, the network manager system 270 may assign a polling thread to the one or more consumer applications of a given active SOA server instance. The polling thread polls the EDN module for an event on behalf of the one or more consumer applications assigned to that polling thread.

At step 406, the network manager system 270 may determine whether the active SOA server instances are under pressure. For example, the active SOA server instances do not have enough polling threads to poll the EDN module. Alternatively, there may be more events posted to the EDN module that may be polled using the polling threads of the active SOA server instances.

If the network manager system 270 determines that the active SOA server instances are under pressure (e.g., YES at step 406) the network manager system 270 allows the active SOA server instances (e.g., consumer applications of the active SOA server instances) to publish a message to a subset of the inactive SOA server instances to request the inactive SOA server instances to become active and start parallel polling of the EDN module (step 408).

At step 410, the consumer applications on the now-activated inactive SOA server instance(s) poll the EDN module. For example, the consumer applications on the now-activated inactive SOA server instance(s) poll the EDN module for one cycle (e.g. a number of times polled by a thread in a schedule called "batch size", or a cycle). According to various embodiments, the batch size may be adjusted dynamically based on the load on the system or the resources available to the system.

At step 412, upon completion of the cycle, the inactive SOA server instance(s) that were activated at step 410 re-assume their inactive status, and are prevented from polling the EDN module. According to various embodiments, the threshold for determining whether the system is under load may be configured. For example, the threshold may be set by default to "X number of successive polls in a cycle" to get a sense of the event load. The threshold may be updated when the initial threshold is reached. In some embodiments, the inactive SOA server instance(s) that were activated at step 410 revert back to inactive status again when there was no successful polling (e.g., the system is no longer under load, there were no events to poll on the EDN module).

If the network manager system 270 determines that the active SOA server instances are not under pressure (e.g., NO at step 406), the network manager system 270 maintains the inactive status of the inactive SOA server instances, and only allows the active SOA server instances to poll the EDN module.

Figure 5:
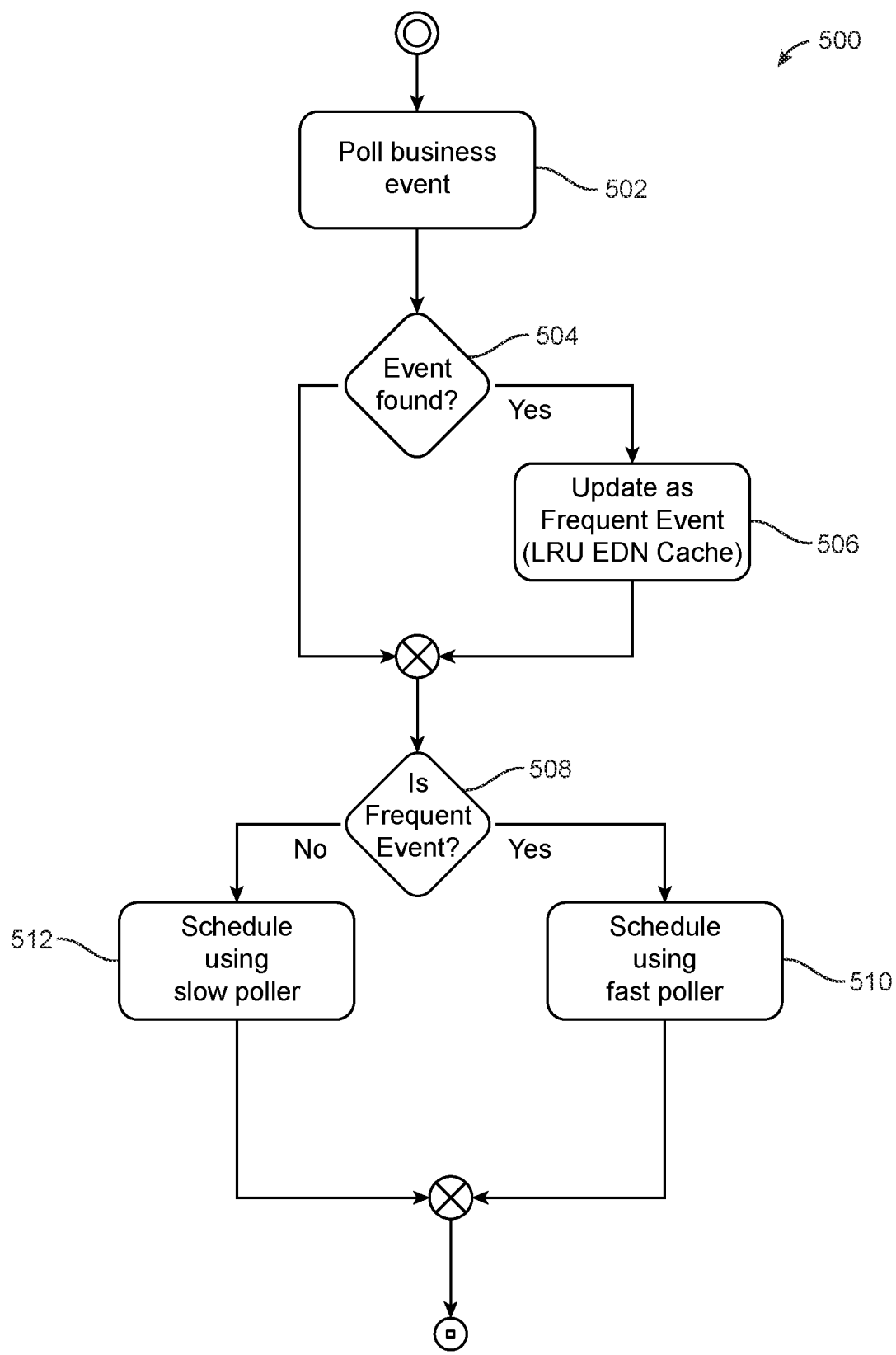
FIG. 5 illustrates an exemplary flowchart of steps for categorizing an event based on two or more available categories, according to at least one embodiment.

FIG. 5 illustrates an exemplary flowchart 500 of steps for categorizing an event based on two or more available categories, according to various embodiments.

At step 502, the network manager system 270 allows the consumer applications of one or more SOA server instances to poll the EDN module. As described above in connection with FIGS. 1 and 2, each SOA server instance may include a local data storage module (e.g., local cache) incorporated in the EDN of that SOA server instance. For example, the local data storage module may be configured to store identifying information for event consumer applications (e.g., IDs for consumer applications that poll the EDN) that most recently successfully polled an event on the EDN.

At step 504, the network manager system 270 determines if an event is identified at the local data storage module of a given SOA server. If the event is identified (e.g., YES at step 504), the event is assigned a first category (e.g., a frequent event) at step 506. At step 508, the network manager system 280 determines whether the identified event is an event in the first category (e.g., a frequent). If the event is in the first category (e.g., a frequent event) (YES at step 508), the event is scheduled using a polling thread with a first polling time interval (e.g., a fast poller) at step 510. If the event is not in the first category (e.g., a non-frequent event) (NO at step 508), the event is scheduled using a polling thread with a second polling time interval (e.g., a slow poller) at step 512. The second polling interval is larger than the first polling interval.

For a big cluster, the proposed system and method will optimize resource consumption computational cost, improve overall performance and health of the system due to on demand parallel polling. In cloud environment, each computation has an associated computational cost. Therefore, the proposed on-demand polling, especially in a large system, will be effective from a computational cost perspective.

In some implementations, an Infrastructure-as-a-Service (IaaS) provider may offer the techniques described above as part of its infrastructure offerings. The following sections describes an IaaS implementation that may offer various cloud services to subscribing customers. A network manager that implements an on-demand parallel polling technique by doing one or more of: (1) using categories for events, consumer applications and/or polling threads with different polling time intervals; (2) sharing threads in a thread pool of a SOA server instance between polling threads and scheduler threads; (3) assigning polling status (e.g., active/inactive) to the SOA server instances, and/or (4) implementing on-demand polling where active SOA server instances may activate inactive SOA server instances on demand, as disclosed in this disclosure may be offered as one of the cloud services.

Example IaaS Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
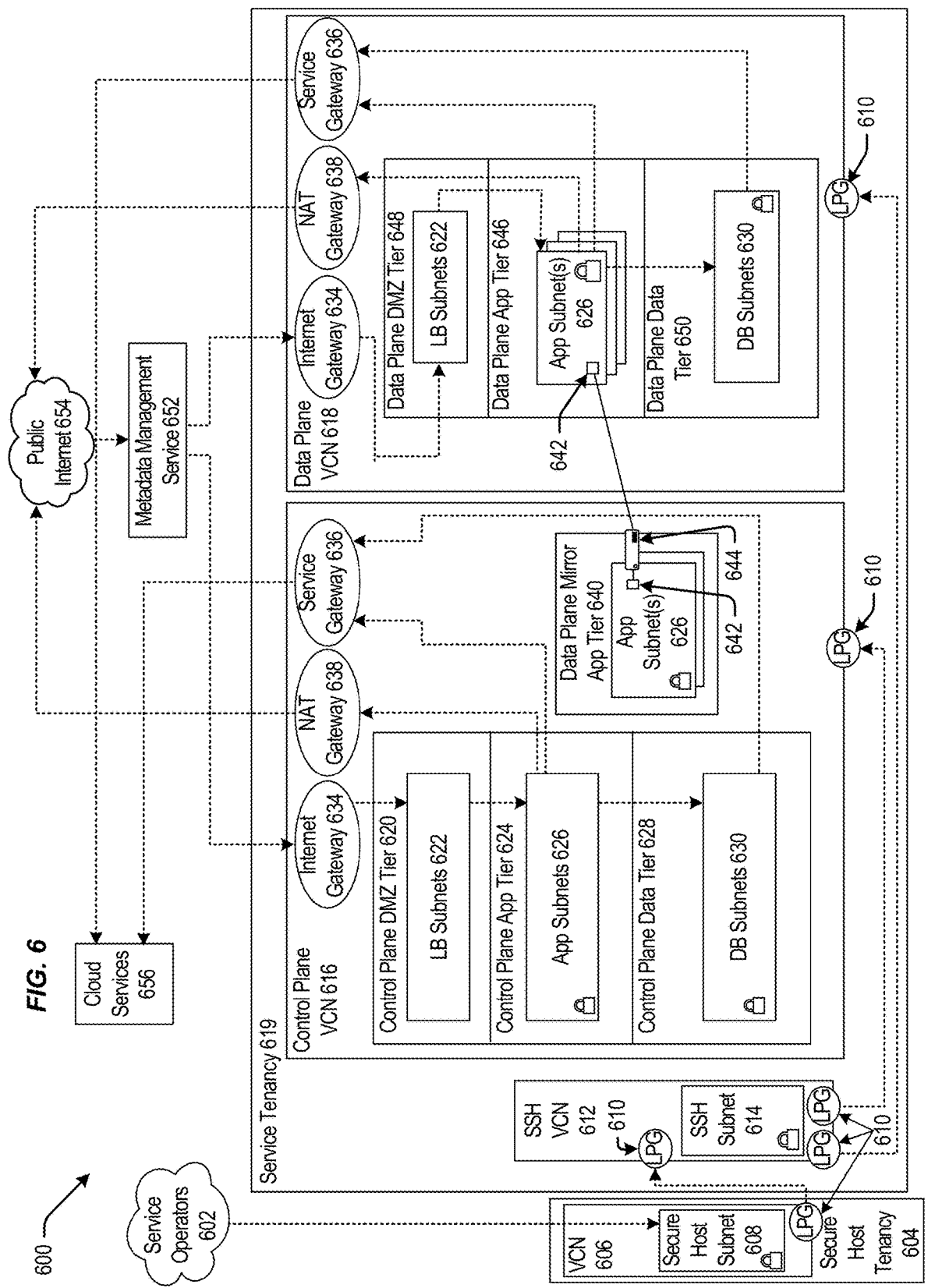
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
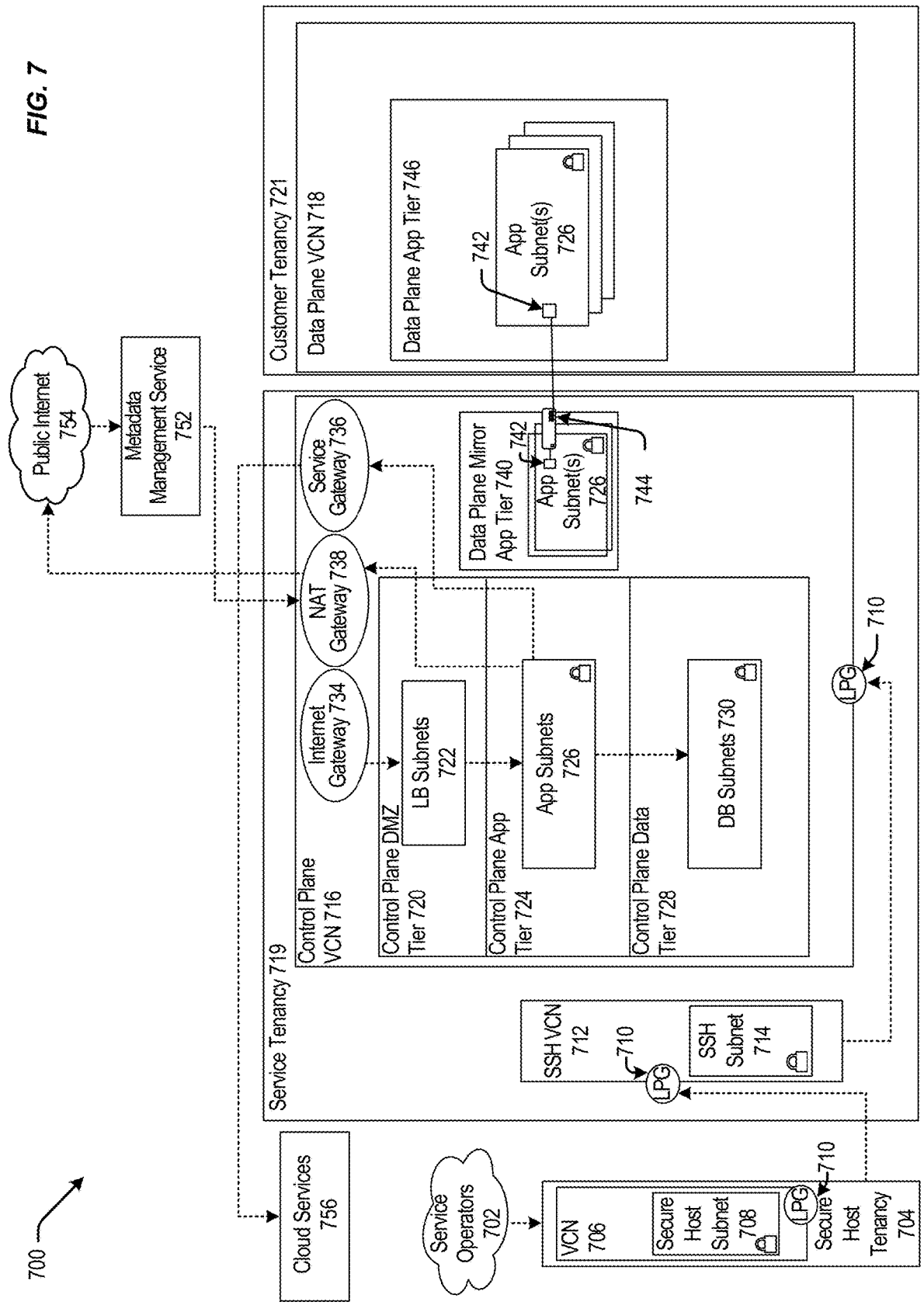
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
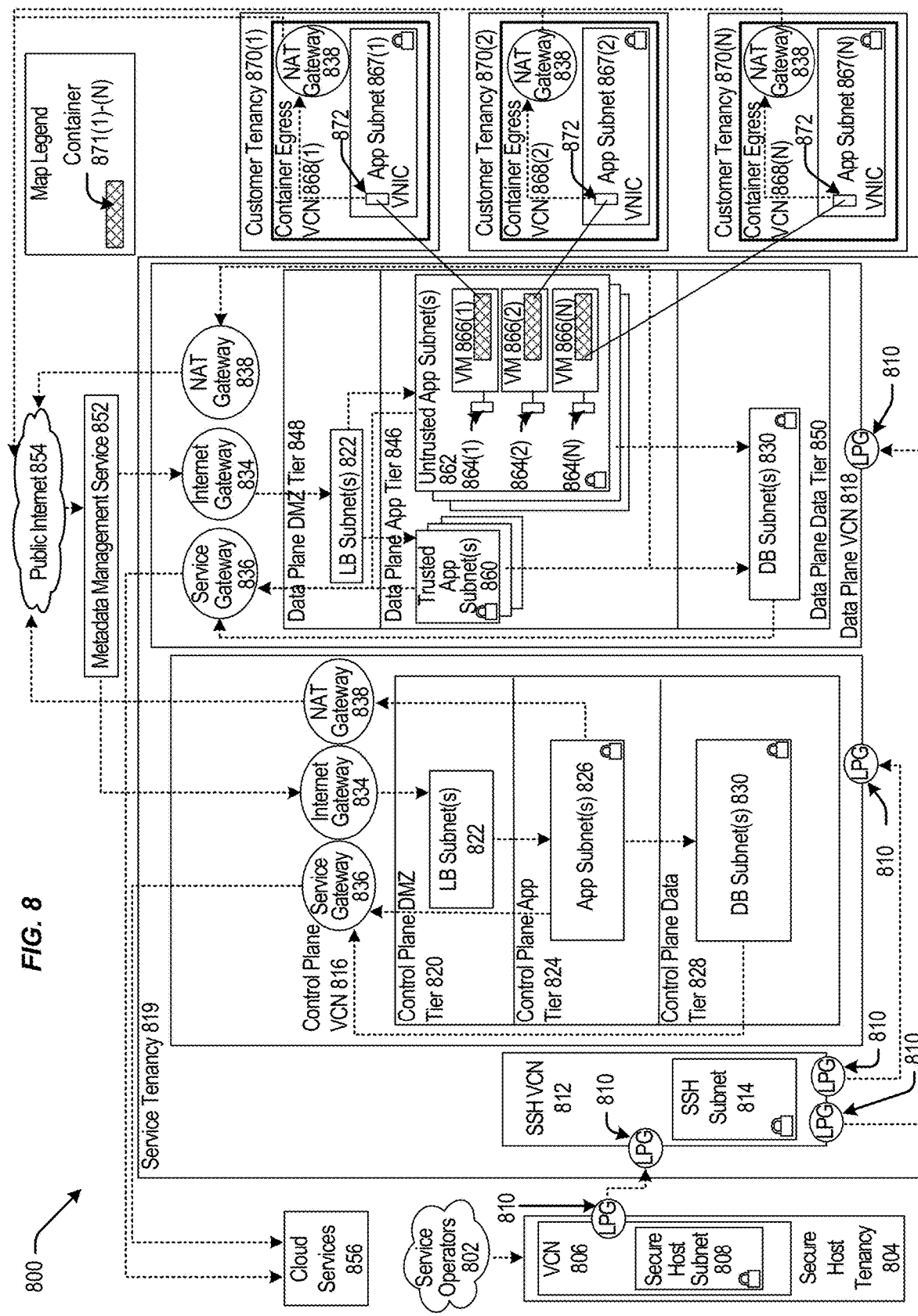
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
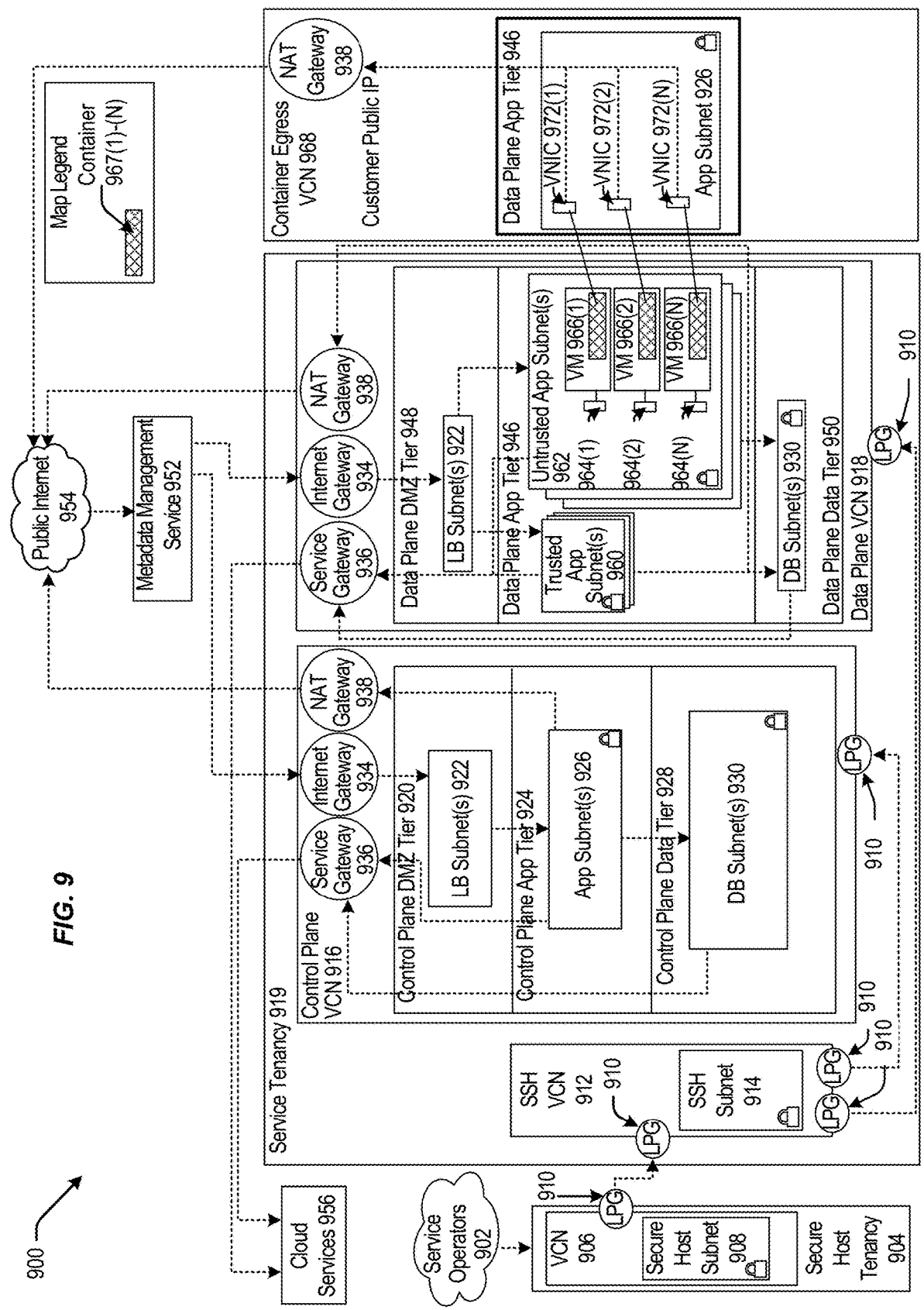
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s) 926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
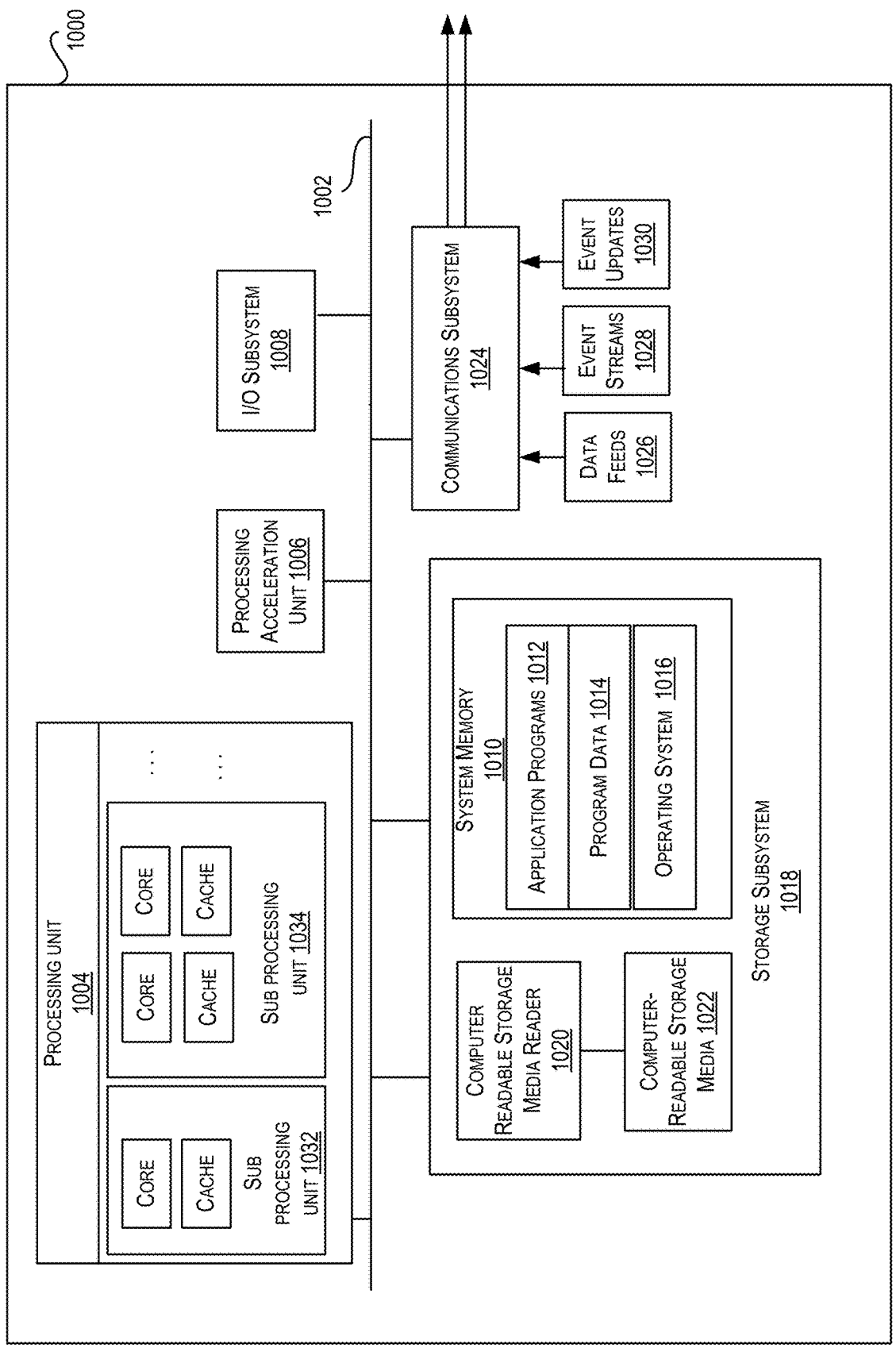
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a network device in a service-oriented architecture system, the method comprising:
receiving a plurality of events at an event delivery network of the service-oriented architecture system;
receiving a plurality of requests from a plurality of consumer applications for polling one or more of the plurality of events;
identifying one or more successfully polled events;
identifying a first set of events, among the successfully polled events, that appear at a first frequency;
assigning a first category to the first set of events;
categorizing consumer applications subscribed to the first set of events in the first category associated with a first polling time interval; and
processing a first portion of the plurality of requests from the plurality of consumer applications at the first polling time interval thereby reducing a polling frequency of the event delivery network, wherein the first portion of the plurality of requests are from the consumer applications in the first category,
wherein a service-oriented architecture server instance includes a first set of threads for polling the event delivery network and a second set of threads for scheduling the first set of threads, the method further comprises:
when processing a first polling request:
assigning a first thread to the consumer applications in the first category;
scheduling, using a second thread, the first thread to poll the event delivery network at the first polling time interval, wherein the first thread is a polling thread and the second thread is a scheduling thread during processing of the first polling request;
when processing a second polling request upon completion of the first polling request:
assigning the second thread to the consumer applications in the first category;
scheduling, using a third thread, the second thread to poll the event delivery network at the first polling time interval, wherein the second thread is a polling thread during processing of the second polling request.

2. The method of claim 1, further comprising:
identifying a second set of events, among the successfully polled events, that appear at a second frequency;
assigning a second category to the second set of events;
categorizing consumer applications subscribed to the second set of events in the second category associated with a second polling time interval different than the first polling time interval; and
processing a second portion of the plurality of requests from the plurality of consumer applications at the second polling time interval, wherein the second portion of the plurality of requests are from the consumer applications in the second category.

3. The method of claim 1, wherein the plurality of events are categorized into at least two categories of events based on a dynamic scheme such that a first event is categorized in the first category and polled at the first polling time interval during a first polling request and the first event is categorized in a second category and polled at a second polling time interval during a second polling request.

4. The method of claim 3, wherein a number of categories and events assigned to each category changes based on a number of the plurality of requests for polling one or more of the plurality of events posted to the event delivery network.

5. The method of claim 1, wherein the plurality of consumer applications are associated with one or more applications on the service-oriented architecture server instance, wherein the service-oriented architecture system includes a plurality of service-oriented architecture server instances that are identical to each other, wherein each service-oriented architecture server instance includes one or more consumer applications.

6. The method of claim 5, further comprising:
determining that a number of the plurality of requests for polling one or more of the plurality of events posted to the event delivery network is below a predetermined threshold;
assigning an active status to a first set of service-oriented architecture server instances, wherein consumer applications of the first set of service-oriented architecture server instances are allowed to poll the event delivery network at assigned polling time intervals; and
assigning an inactive status to a second set of service-oriented architecture server instances, wherein consumer applications of the second set of service-oriented architecture server instances are prevented from polling the event delivery network.

7. The method of claim 6, further comprising:
determining that the number of the plurality of requests for polling one or more of the plurality of events posted to the event delivery network matches or surpasses the predetermined threshold;
broadcasting, by the consumer applications of the first set of service-oriented architecture server instances, a message to activate one or more of the consumer applications of the second set of service-oriented architecture server instances;
upon activation, the activated one or more of the consumer applications of the second set of service-oriented architecture server instances poll the event delivery network at assigned polling time intervals;
upon completing one round of polling, the activated one or more of the consumer applications of the second set of service-oriented architecture server instances re-assume an inactive status.

8. The method of claim 1, wherein allocation of a thread as a polling thread or a scheduling thread is based on a number of the plurality of requests for polling one or more of the plurality of events posted to the event delivery network.

9. The method of claim 1, wherein the plurality of consumer applications are one or more service-oriented architecture server instances of the service-oriented architecture system.

10. The method of claim 1, wherein identifying the one or more successfully polled events further comprises:
storing a list of events polled within a predetermined amount of time; and
identifying, on the list of events, the one or more events that were successfully polled.

11. A system comprising:
one or more processors; and
a storage device storing program instructions that, when executed by the one or more processors, cause the one or more processors to:

receive a plurality of events at an event delivery network of a service-oriented architecture system;
receive a plurality of requests from a plurality of consumer applications for polling one or more of the plurality of events;
identify one or more successfully polled events;
identify a first set of events, among the successfully polled events, that appear at a first frequency;
assign a first category to the first set of events;
categorize consumer applications subscribed to the first set of events in the first category associated with a first polling time interval; and
process a first portion of the plurality of requests from the plurality of consumer applications at the first polling time interval thereby reducing a polling frequency of the event delivery network, wherein the first portion of the plurality of requests are from the consumer applications in the first category,
wherein a given service-oriented architecture server instance includes a first set of threads for polling the event delivery network and a second set of threads for scheduling the first set of threads, wherein the instructions, when executed by the one or more processors, further cause the one or more processors to:
when processing a first polling request:
assign a first thread to the consumer applications in the first category;
schedule, using a second thread, the first thread to poll the event delivery network at the first polling time interval, wherein the first thread is a polling thread and the second thread is a scheduling thread during processing of the first polling request;
when processing a second polling request upon completion of the first polling request:
assign the second thread to the consumer applications in the first category;
schedule, using a third thread, the second thread to poll the event delivery network at the first polling time interval, wherein the second thread is a polling thread during processing of the second polling request.

12. The system of claim 11, wherein the instructions, when executed by the one or more processors, further cause the one or more processors to:
identify a second set of events, among the successfully polled events, that appear at a second frequency;
assign a second category to the second set of events;
categorize consumer applications subscribed to the second set of events in the second category associated with a second polling time interval different than the first polling time interval; and
processing a second portion of the plurality of requests from the plurality of consumer applications at the second polling time interval, wherein the second portion of the plurality of requests are from the consumer applications in the second category.

13. The system of claim 11, wherein the plurality of events are categorized into at least two categories of events based on a dynamic scheme such that a first event is categorized in the first category and polled at the first polling time interval during a first polling request and the first event is categorized in a second category and polled at a second polling time interval during a second polling request.

14. The system of claim 11, wherein the plurality of consumer applications are associated with one or more applications on a service-oriented architecture server instance, wherein the service-oriented architecture system includes a plurality of service-oriented architecture server instance that are identical to each other, wherein each service-oriented architecture server instance includes one or more consumer applications.

15. The system of claim 14, wherein the instructions, when executed by the one or more processors, further cause the one or more processors to:
determine that a number of the plurality of requests for polling one or more of the plurality of events posted to the event delivery network is below a predetermined threshold;
assign an active status to a first set of service-oriented architecture server instances, wherein consumer applications of the first set of service-oriented architecture server instances are allowed to poll the event delivery network at assigned polling time intervals; and
assign an inactive status to a second set of service-oriented architecture server instances, wherein consumer applications of the second set of service-oriented architecture server instances are prevented from polling the event delivery network.

16. The system of claim 15, wherein the instructions, when executed by the one or more processors, further cause the one or more processors to:
determine that the number of the plurality of requests for polling one or more of the plurality of events posted to the event delivery network matches or surpasses the predetermined threshold, wherein:
the consumer applications of the first set of service-oriented architecture server instances broadcast a message to activate one or more of the consumer applications of the second set of service-oriented architecture server instances;
upon activation, the activated one or more of the consumer applications of the second set of service-oriented architecture server instances poll the event delivery network at assigned polling time intervals; and
upon completing one round of polling, the activated one or more of the consumer applications of the second set of service-oriented architecture server instances re-assume an inactive status.

17. The system of claim 11, wherein allocation of a thread as a polling thread or a scheduling thread is based on a number of the plurality of requests for polling one or more of the plurality of events posted to the event delivery network.

18. A non-transitory computer-readable storage medium storing a plurality of instructions executable by one or more processors, wherein the plurality of instructions when executed by the one or more processors causes the one or more processors to perform processing comprising:
receiving a plurality of events at an event delivery network of a service-oriented architecture system;
receiving a plurality of requests from a plurality of consumer applications for polling one or more of the plurality of events;
identifying one or more successfully polled events;
identifying a first set of events, among the successfully polled events, that appear at a first frequency;
assigning a first category to the first set of events;
categorizing consumer applications subscribed to the first set of events in the first category associated with a first polling time interval; and
processing a first portion of the plurality of requests from the plurality of consumer applications at the first polling time interval thereby reducing a polling frequency of the event delivery network, wherein the first portion of the plurality of requests are from the consumer applications in the first category, wherein a service-oriented architecture server instance includes a first set of threads for polling the event delivery network and a second set of threads for scheduling the first set of threads, the processing further comprises:

when processing a first polling request:

assigning a first thread to the consumer applications in the first category;

scheduling, using a second thread, the first thread to poll the event delivery network at the first polling time interval, wherein the first thread is a polling thread and the second thread is a scheduling thread during processing of the first polling request;

when processing a second polling request upon completion of the first polling request:

assigning the second thread to the consumer applications in the first category;

scheduling, using a third thread, the second thread to poll the event delivery network at the first polling time interval, wherein the second thread is a polling thread during processing of the second polling request.

* * * * *

UNITED STATES PATENT AND TRADEMARK OFFICE
CERTIFICATE OF CORRECTION

| | | |
|---|---|---|
| PATENT NO. | : 12,373,251 B2 | Page 1 of 1 |
| APPLICATION NO. | : 18/086514 | |
| DATED | : July 29, 2025 | |
| INVENTOR(S) | : Saha | |

It is certified that error appears in the above-identified patent and that said Letters Patent is hereby corrected as shown below:

On the Title Page

Column 1, item (54) under title, Line 1, delete "HANDLING" and insert -- CONTROLLING --, therefor.

In the Specification

In Column 1, Line 1, under title, delete "HANDLING" and insert -- CONTROLLING --, therefor.

In Column 4, Line 60, delete "and or" and insert -- and/or --, therefor.

In Column 12, Lines 63-64, delete "BlackBerry 8," and insert -- Blackberry®, --, therefor.

Signed and Sealed this
Sixteenth Day of December, 2025

John A. Squires
*Director of the United States Patent and Trademark Office*